April 26, 1949.　　　H. W. GOFF　　　2,468,193
TORQUE LIMITING DEVICE
Filed April 25, 1945
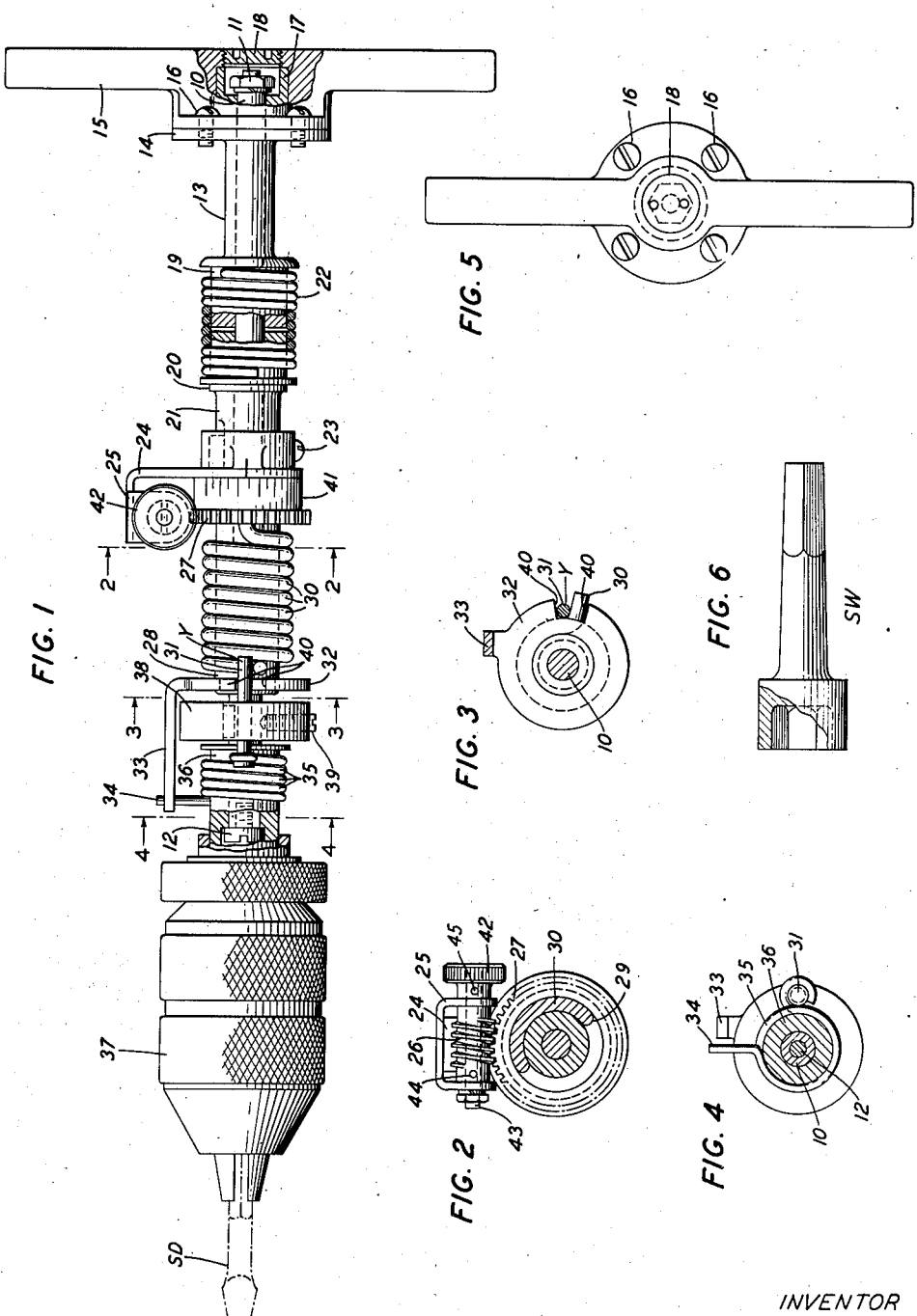
INVENTOR
H. W. GOFF
BY J. MacDonald
ATTORNEY Patented Apr. 26, 1949

2,468,193

UNITED STATES PATENT OFFICE 2,468,193

TORQUE LIMITING DEVICE

Harold W. Goff, Manhasset, N. Y., assignor to Bell Telephone Laboratories, Incorporated, New York, N. Y., a corporation of New York Application April 25, 1945, Serial No. 590,275

4 Claims. (Cl. 64—30)

This invention relates to torque limiting devices.

The object of the invention is the provision of a torque limiting device which is well adapted for use for automatically releasing a driven element from a driving element whenever the torque for the operation of the driven element exceeds that of the adjusted tension of a torque spring operatively connecting the driving to the driven element.

In connection with the securing of machine parts by the use of bolts and screws, it is frequently required that each of the bolts and screws be tightened to exert a predetermined pressure between the parts (while avoiding the damaging of the parts or the breaking of the bolts or screws) as it often occurs by the use of ordinary screwdrivers or socket wrenches and the present embodiment of the invention, for example, is a screwdriver for controlling the tightening effect of screws and bolts on machine parts.

In the drawing,

Fig. 1 is an assembly view with a number of operating parts shown in section;

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1;

Fig. 5 is an end view looking toward the handle of the screwdriver; and

Fig. 6 is a view of a socket wrench adapted to be secured to a chuck mounted on the driven element of the torque limiting device.

The torque limiting device of this invention as shown in Fig. 1 consists of a shaft 10 terminating at one end with a screw threaded portion for receiving a nut 11 and at its opposite end portion with a threaded hole for receiving a screw 12. On shaft 10 is mounted for free rotation thereon a sleeve 13 formed with a circular flange portion 14 provided for securing as by a number of screws 16, a handle 15 fitted on an enlarged portion 17 of sleeve 13, this portion being formed with a counterbore provided for housing the nut 11 and is interiorly screw threaded for receiving a plug 18 screwed flush with the surface of the handle 15.

The opposite end of the sleeve 13 is formed with a drum portion 19 similar in diameter to that of a drum portion 20 which is formed with a sleeve 21 mounted for free rotation on the shaft 10 and on these drum portions is closely fitted a helical spring 22 provided to perform the function of a one-way clutch for imparting a unidirectional movement to a screwdriver SD upon a back and forth operation of the handle 15 as will be hereinafter described in detail.

On the opposite end of sleeve 21 is secured as by a set screw 23, an arm 24 shown in Figs. 1 and 2 formed with similar lug portions 25 serving as bearings for a shaft 43 on which is keyed as by pin 44 a worm screw 26 disposed in engageable relation with a worm gear 27 keyed to or formed with a sleeve 28 mounted for free rotation on the shaft 10, the worm gear 27 having a drilled hole 29 best seen in Fig. 2 for receiving the end of a torque spring 30, mounted on the sleeve 28 and having its opposite end bent radially for engaging the end Y of a pin 31, carried by a collar 38 itself secured to the shaft 10 as by a set screw 39. On the opposite end of sleeve 28 as shown in Figs. 1 and 3, is keyed a disc member 32 having an arm 33 bent in line parallel to the longitudinal axis of shaft 10 for engagement as shown in Figs. 1 and 4 with the end 34 of a clutch spring 35 closely fitted over sleeve 36 which is mounted for free rotation on the shaft 10 and forms part of chuck 37 provided for securing as the case may be, the screwdriver SD or a socket wrench SW shown in Fig. 6. Sleeve 36 is retained against longitudinal movement on shaft 10 by the screw 12 engaging this end of the shaft, while the opposite end of clutch spring 35 is hooked to the opposite end of pin 31, the end Y of pin 31 extending through an indentation 40 formed at the periphery of disc 32 as best seen in Fig. 3 for holding the torque spring 30 to its adjusted initial tension, the gear 27 being formed with a hub portion 41 having marks as shown in Fig. 1 cooperating with an index mark on the hub of arm 24 for indicating the tension of the torque spring 30, which tension is effected by the manual rotation of worm screw 26 by a knob 42 keyed on the supporting shaft 43 by a pin 45.

In the operation of the torque limiting device of this invention with the screwdriver SD engaging a screw, not shown, the operation of the handle 15 and thereby that of drum portion 19 in a clockwise direction causes the clutch spring 22 to tighten on the periphery of the drums 19 and 20 for rotating the sleeve 21 and its arm 24 and through the worm 26 rotates the worm gear 27, the sleeve 28 and the disc 32, while because of the engagement of torque spring 30 with the end Y of pin 31, this spring is effective to rotate the collar 38 thus causing the tightening of clutch spring 35 around the sleeve 36 for turning the chuck 37 and the screwdriver SD to a point wherein the force required for the tightening of the screw becomes greater than that of the adjusted tension of torque spring 30, thus causing a relative movement between the disc 32 and collar 33 within the limit defined by the indentation 40 at the periphery of disc 32, and the consequent engagement of arm 33 carried by this disc with the radial arm 34 of clutch spring 35 for uncoiling this clutch spring and thereby freeing the sleeve 36 permitting the turning movement of handle 15 ineffective relative to the clutch spring 35 so as to prevent further tightening of the screw, the clutch spring 22 permitting the back and forth operation of handle 15 in restricted places not permitting its unidirectional rotation.

While the torque limiting device above described is disclosed as an example embodied in a screwdriver, it is obvious that the collar 14 of sleeve 13 may be connected to a motor shaft for operating a driven shaft which may be connected to the clutch 37 or any other form of shaft coupling and that the torque spring 30 may be constructed for transmitting torques of any value desired without affecting the mechanism of the present invention.

What is claimed is:

1. A torque limiting device comprising a mounting shaft, a driving element in the form of a sleeve mounted on said shaft, a torque spring having one end connected to said driving element, a collar member keyed on said shaft having means for engaging the opposite end of said torque spring, a disc member secured to one end of said sleeve adjacent said collar member, a driven element mounted on said shaft at the end thereof having a drum shaped portion, a clutch spring fitted over said drum having one end hooked to means carried by said collar member and its other end engaging means carried by said disc for operating said clutch spring for releasing said driven element upon a movement of said driving element relative to said driven element.

2. In a torque limiting device, a driven element having a cylindrical portion, a helical spring wire clutch fitted over said cylindrical portion, a driving element having a cylindrical portion, a torque spring mounted on the cylindrical portion of said driving element, said torque spring having one of its ends secured to said driving element, a mounting shaft for said driving element and driven element, a collar member keyed on said shaft, a disc keyed on said driving element adjacent said collar member, means carried by said collar member engaging the other end of said torque spring and engaging means carried by said disc for holding said torque spring to a predetermined tension, and means carried by said disc for engaging the opposite end of said clutch spring, for controlling the operation of said driven element upon a relative movement between said driving element and said driven element.

3. A torque limiting device comprising a shaft, a driving element in the form of a sleeve mounted for free rotation on said shaft, a collar member keyed on said shaft adjacent one end of said sleeve, a disc member keyed on one end of said sleeve adjacent said collar member, a torque spring having one of its ends secured to said sleeve and its other end engaging means carried by said collar, said means engaging a stop in said disc for holding said torque spring under normal tension, a driven element having a drum-shaped portion, a clutch spring fitted over said drum-shaped portion having one end secured to means carried by collar member and its other end disposed in engageable relation with means carried by said disc and operated thereby for freeing said driven element upon a movement of said driving element relative to said driven element and means manually operable for controlling the tension of said torque spring.

4. A torque limiting device comprising a shaft, a sleeve mounted for free rotation on said shaft, a handle secured to said sleeve, a drum-shaped portion formed with said sleeve, another sleeve mounted for free rotation on said shaft having a drum-shaped portion disposed in juxtaposition to the first mentioned drum-shaped portions, a clutch spring operatively connecting the first-mentioned sleeve to the second-mentioned sleeve for rotating the latter upon the movement of said handle, a third sleeve mounted for free rotation on said shaft, a worm gear mounted on said third sleeve at one end thereof, a worm engaging said worm gear, a support for said worm keyed to the opposite end of the second-mentioned sleeve, means for actuating said worm for imparting movement to said third sleeve relative to the second-mentioned sleeve, a disc keyed to the opposite end of said third sleeve having an arm extending in line parallel to the axis of said shaft, a collar keyed to said shaft, a pin carried by said collar extending from both sides thereof for engagement with means carried by said disc, a torque spring mounted concentric to said third sleeve and having one of its ends engaging said worm gear and its other end the pin carried by said collar, a sleeve mounted on said shaft, a clutch spring mounted concentric on the last-mentioned sleeve having one of its ends secured to the pin carried by said collar and its other end extending in operative relation with the arm carried by said disc whereby a movement imparted to said handle for rotating the last-mentioned sleeve which is greater than the tension of said torque spring being effective to operate the last-mentioned clutch spring for permitting free rotation of said handle for controlling the amount of torque imparted to the last-mentioned sleeve.

HAROLD W. GOFF.

REFERENCES CITED

The following references are of record in the file of this patent:

UNITED STATES PATENTS

| Number | Name | Date |
|---|---|---|
| 620,916 | Hafner | Mar. 14, 1899 |
| 1,298,395 | Proctor | Mar. 25, 1919 |
| 1,561,537 | Hayes | Nov. 17, 1925 |
| 1,860,871 | Pouliot | May 31, 1932 |
| 2,151,724 | Wengel et al. | Mar. 28, 1939 |
| 2,242,379 | Wahl | May 20, 1941 |
| 2,358,461 | Latimer | Sept. 19, 1944 |
| 2,360,187 | Almen | Oct. 10, 1944 |

FOREIGN PATENTS

| Number | Country | Date |
|---|---|---|
| 19,479 | Australia | 1934 |